(12) United States Patent
Wu et al.

(10) Patent No.: US 10,406,459 B2
(45) Date of Patent: Sep. 10, 2019

(54) DRY FILTER

(71) Applicant: ZHEJIANG SANHUA INTELLIGENT CONTROLS CO., LTD., Zhejiang (CN)

(72) Inventors: Linping Wu, Zhejiang (CN); Weiwei Jiang, Zhejiang (CN)

(73) Assignee: Zhejiang Sanhua Intelligent Controls CO., Ltd., Zhejiang (CN)

( * ) Notice: Subject to any disclaimer, the term of this patent is extended or adjusted under 35 U.S.C. 154(b) by 0 days.

(21) Appl. No.: 15/760,636

(22) PCT Filed: Aug. 23, 2016

(86) PCT No.: PCT/CN2016/096409
§ 371 (c)(1),
(2) Date: Mar. 16, 2018

(87) PCT Pub. No.: WO2017/045514
PCT Pub. Date: Mar. 23, 2017

(65) Prior Publication Data
US 2018/0257009 A1    Sep. 13, 2018

(30) Foreign Application Priority Data

Sep. 18, 2015    (CN) .......................... 2015 1 0600491

(51) Int. Cl.
*B01D 29/56*    (2006.01)
*B01D 29/05*    (2006.01)
*B01D 15/00*    (2006.01)
*B01D 36/00*    (2006.01)
*F25B 43/00*    (2006.01)

(52) U.S. Cl.
CPC ............. *B01D 29/56* (2013.01); *B01D 15/00* (2013.01); *B01D 29/05* (2013.01); *B01D 36/003* (2013.01); *F25B 43/00* (2013.01); *F25B 43/003* (2013.01)

(58) Field of Classification Search
CPC ........ B01D 29/56; B01D 15/00; B01D 29/05; B01D 36/003; F25B 43/003; F25B 43/00
USPC ... 210/232, 689, 289, 291, 446, 456, DIG. 6
See application file for complete search history.

(56) References Cited

U.S. PATENT DOCUMENTS

| | | |
|---|---|---|
| 4,637,881 A | 1/1987 | Sciuto |
| 4,811,571 A | 3/1989 | Mayer |
| 2012/0217200 A1* | 8/2012 | Wu ....................... F25B 43/003 210/352 |

FOREIGN PATENT DOCUMENTS

| | | |
|---|---|---|
| CN | 2597911 Y | 1/2004 |
| CN | 203286824 U | 11/2013 |

\* cited by examiner

*Primary Examiner* — Madeline Gonzalez
(74) *Attorney, Agent, or Firm* — Gang Yu

(57) ABSTRACT

Provided is a dry filter, including: a barrel; a first end cover and a second end cover; a first filter layer, provided at an end, close to the first end cover (20), in the barrel (10); a dry layer, provided in the barrel and located at a side, away from the first end cover, of the first filter layer, the dry layer including a first filter plate and a second filter plate, the second filter plate and a barrel wall of the barrel forming a dry chamber; and a first fixing structure, defining the position of the second filter plate in the barrel, such that a buffer chamber is formed between the second filter plate, an inner wall of the barrel and the second end cover. The dry filter solves the problems of easy accumulation of impurities on a filter plate of an existing dry filter and low utilization rate.

9 Claims, 6 Drawing Sheets

DRY FILTER

TECHNICAL FIELD

The disclosure relates to the technical field of filter equipment, and more particularly to a dry filter.

BACKGROUND

A one-way dry filter is installed in a refrigerating pipeline flowing in one way and is usually installed between a condenser and an expansion valve. It can effectively prevent from gathering pollutants in a flowing direction, and can absorb moisture in a refrigerant. By means of combined design of drying and filtration inside the one-way dry filter, filtered and soluble substances can be effectively prevented from entering key components of a refrigerating system, so as to ensure that the system runs under an optimal state.

The structure of the one-way dry filter in the prior art is as shown in FIG. 1 and FIG. 2. The one-way dry filter comprises a barrel 1', a first end cover 2' and a second end cover 3' provided at two ends of the barrel 1', and a filter layer 4' and a dry layer provided in the barrel 1' in sequence, wherein the dry layer comprises a first filter plate 5' and a second filter plate 6', a dry chamber is formed between the first filter plate 5' and the second filter plate 6', and a molecular sieve is provided in the dry chamber. The one-way dry filter in the related art has the following problems.

Because an outlet of the one-way dry filter is provided in the middle of a cross section of the barrel and the second filter plate 6' abuts against the second end cover 3, an area in the barrel along a central line thereof forms a low-pressure area when the refrigerant flows through the one-way dry filter. In the presence of the low-pressure area, the refrigerant will flow to a central part of the second filter plate 6' (as shown in an arrow direction in FIG. 1) under the action of pressure regardless of a flowing direction of the refrigerant out of the first filter plate 5'. The flowing direction of the refrigerant enables filtered impurities to be accumulated in the middle of the first filter plate 5', and enables the resistance of the refrigerant to ascend linearly. Even if the middle resistance of the first filter plate 5' is over-large, the refrigerant flows to an inner wall of the barrel 1', but the refrigerant will be urged to flow to the middle of the first filter plate 5' under the influence of the pressure difference. In conclusion, the utilization rate of the first filter plate 5' of the one-way dry filter in the related art is low, and meanwhile, the pressure is increased due to accumulation of the filtered impurities in the middle of the first filter plate 5', thereby affecting the service life of a product.

SUMMARY

The main objective of the disclosure is to provide a dry filter, intended to solve the problems in the related art of easy accumulation of impurities on a filter plate of a dry filter and low utilization rate.

To this end, the disclosure provides a dry filter, comprising: a barrel; a first end cover and a second end cover, sealing two ends of the barrel respectively; a first filter layer, provided at an end, close to the first end cover, in the barrel; and a dry layer, provided in the barrel and located at a side, away from the first end cover, of the first filter layer, the dry layer comprising a first filter plate close to the first filter layer and a second filter plate away from the first filter layer, the first filter plate, the second filter plate and a barrel wall of the barrel forming a dry chamber. The dry filter may further comprise: a first fixing structure, the first fixing structure defining the position of the second filter plate in the barrel, such that a buffer chamber is formed between the second filter plate, an inner wall of the barrel and the second end cover.

Further, the dry filter may further comprise a second filter layer, the second filter layer being located in the buffer chamber.

Further, the second filter layer comprises: a plurality of superposed filter sheets of the second filter layer, the filter sheets of the second filter layer being provided in the first fixing structure.

Further, the first fixing structure comprises: a first bottom plate, abutting against the second end cover, a first overflowing hole being provided on the first bottom plate; and a plurality of first clamping jaws, provided on the first bottom plate, a first accommodating space for accommodating the second filter layer being formed between the first clamping jaws, an end, away from the second end cover, of each first clamping jaw abutting against the second filter plate.

Further, an end, away from the second end cover, of each first clamping jaw has a hook portion hooking the second filter layer.

Further, each first clamping jaw is provided with a recessed portion fitting an outer side wall of the second filter layer.

Further, the first filter layer comprises a plurality of superposed filter sheets of the first filter layer, and the dry filter may further comprise: a second fixing structure, the filter sheets of the first filter layer being provided in the second fixing structure.

Further, the second fixing structure comprises: a second bottom plate, abutting against the first filter plate, second overflowing holes being provided on the second bottom plate; and a plurality of second clamping jaws, provided on the second bottom plate, a second accommodating space for accommodating the first filter layer being formed between the second clamping jaws, an end, away from the first end cover, of each second clamping jaw abutting against the first filter plate.

Further, the distance between the first filter plate and the first end cover is equal to the distance between the second filter plate and the second end cover.

Further, the first filter plate and/or the second filter plate are/is provided with third overflowing holes.

Further, a molecular sieve is provided in the dry chamber.

By means of the technical solution of the disclosure, the dry filter further internally comprises a first fixing structure. The first fixing structure defines the position of a second filter plate in a barrel, such that a buffer chamber is formed between the second filter plate, an inner wall of the barrel and a second end cover. Due to the presence of the buffer chamber in the barrel, when flowing through the buffer chamber, a refrigerant can be buffered, such that the pressure difference of the refrigerant in a radial direction of the barrel is relieved, and the refrigerant can more uniformly flow to the second filter plate. The above-mentioned structure can increase the utilization rate of the second filter plate and can also alleviate the situation of accumulation of impurities. Therefore, the technical solution of the disclosure solves the problems in the related art of easy accumulation of impurities on a filter plate of an existing dry filter and low utilization rate.

BRIEF DESCRIPTION OF THE DRAWINGS

The drawings of the specification, forming a part of the present application, are used to provide further understanding of the disclosure. The schematic embodiments and illustrations of the disclosure are used to explain the disclosure, and do not form improper limits to the disclosure, wherein.

Herein, the drawings comprise the following drawing marks:

1', barrel; 2', first end cover; 3', second end cover; 4', filter layer; 5', first filter plate; 6', second filter plate; 10, barrel; 20, first end cover; 30, second end cover; 40, dry layer; 41, first filter plate; 42, second filter plate; 50, first fixing structure; 51, bottom plate; 511, first overflowing hole; 52, first clamping jaw; 521, hook portion; 522, recessed portion; 60, buffer chamber; 70, second filter layer; 80, second fixing structure; 90, third overflowing hole; and 100, first filter layer.

DETAILED DESCRIPTION OF THE EMBODIMENTS

It is important to note that embodiments in the present application and characteristics in the embodiments may be combined under the condition of no conflicts. The disclosure will be illustrated hereinbelow with reference to the drawings and in conjunction with the embodiments in detail.

Figure 3:
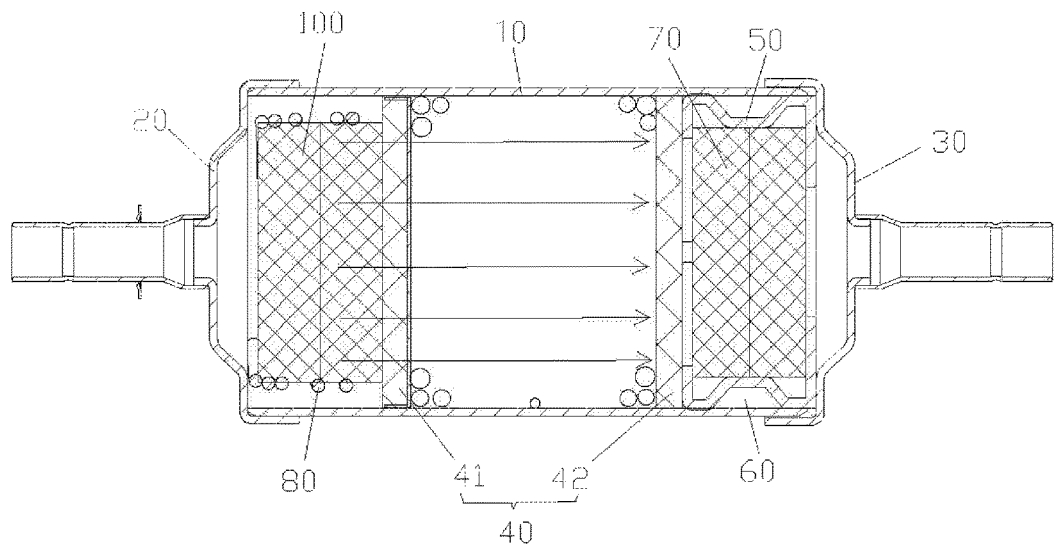
FIG. 3 shows a schematic diagram of an internal structure of a dry filter according to an embodiment 1 of the disclosure and a flowing direction of a refrigerant.

As shown in FIG. 3, a dry filter in an embodiment 1 comprises a barrel 10, a first end cover 20, a second end cover 30, a first filter layer 100 and a dry layer 40, wherein the first end cover 20 and the second end cover 30 seal two ends of the barrel 10 respectively, and the first filter layer 100 is provided at an end, close to the first end cover 20, in the barrel 10. The dry layer 40 is provided in the barrel 10 and located at a side, away from the first end cover 20, of the first filter layer 100. The dry layer 40 comprises a first filter plate 41 close to the first filter layer 100 and a second filter plate 42 away from the first filter layer 100, the first filter plate 41, the second filter plate 42 and a barrel wall of the barrel 10 forming a dry chamber. The dry filter in the embodiment 1 further comprises a first fixing structure 50, the first fixing structure 50 defining the position of the second filter plate 42 in the barrel 10, such that a buffer chamber 60 is formed between the second filter plate 42, an inner wall of the barrel 10 and the second end cover 30.

By means of the technical solution of the embodiment 1, the dry filter further internally comprises the first fixing structure 50. The first fixing structure 50 defines the position of the second filter plate 42 in the barrel 10, such that the buffer chamber 60 is formed between the second filter plate 42, an inner wall of the barrel 10 and the second end cover 30. Due to the presence of the buffer chamber 60 in the barrel 10, when flowing through the buffer chamber 60, a refrigerant can be buffered, such that the pressure difference of the refrigerant in a radial direction of the barrel 10 is relieved, and the refrigerant can more uniformly flow to the second filter plate 42. The above-mentioned structure can increase the utilization rate of the second filter plate 42 and can also alleviate the situation of accumulation of impurities, thereby making the refrigerant more stably flow inside the whole product. Therefore, the technical solution of the embodiment 1 solves the problems in the related art of easy accumulation of impurities on a filter plate of an existing dry filter and low utilization rate.

Figure 2:
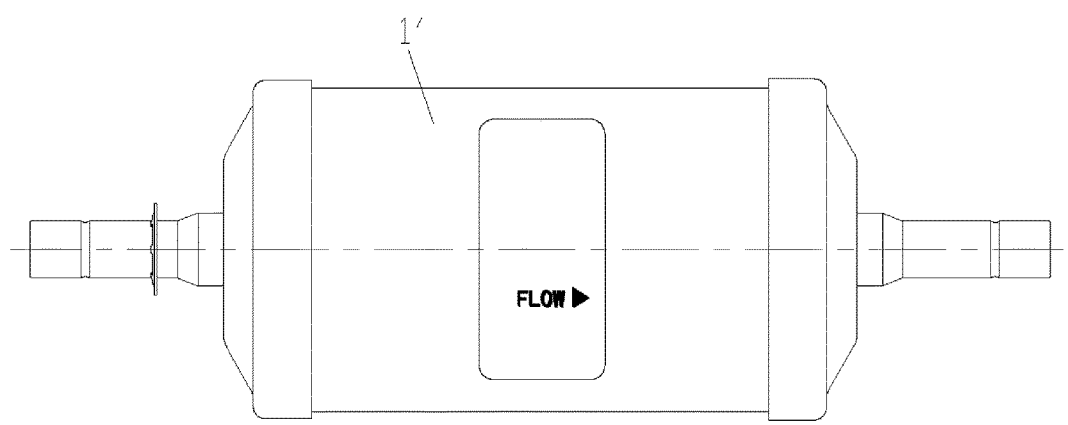
FIG. 2 shows a structure diagram of a housing of a dry filter in FIG. 1.

As shown in FIG. 2, in the technical solution of the embodiment 1, the dry filter further comprises a second filter layer 70, the second filter layer 70 being located in the buffer chamber 60. Compared with the prior art, the dry filter in the embodiment 1 is added with a filter structure, so that the filter accuracy of the dry filter can be improved, thereby better protecting a system.

Figure 1:
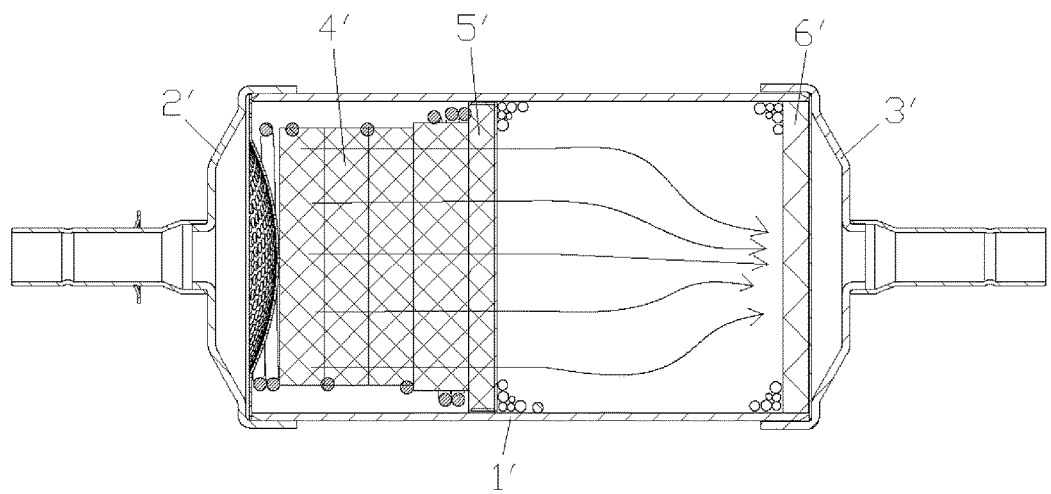
FIG. 1 shows a schematic diagram of the structure of a dry filter in the prior art and a flowing direction of a refrigerant therein.

Specifically, the second filter layer 70 comprises a plurality of superposed filter sheets of the second filter layer, the filter sheets of the second filter layer being provided in the first fixing structure 50, thereby simplifying an internal structure of the dry filter. Meanwhile, Installation positions of an inlet and an outlet of the dry filter in the prior art cannot be exchanged, but due to addition of the second filter layer 70 in the barrel 10 of the dry filter in the embodiment 1, random installation regardless of an inlet and an outlet can be implemented. Specifically speaking, as shown in FIG. 1 and FIG. 2 in the prior art, an inlet (left side) of a barrel 1' needs to be connected to a flow inlet of a refrigerant in a system, and once reverse installation, the refrigerant flows through a second filter plate 6' in a right area, and impurities in the system are completely collected in the second filter plate 6'. In the absence of other filter structures between the second filter plate 6' and a second end cover 3', pressure drop in the barrel 1' will be immediately increased even if a small number of impurities are collected on the second filter plate 6'. Meanwhile, a small-space flow channel is designed in the right area, and the left area is an optimal place designed for filtering the collected impurities. Therefore, in case of reverse installation, the life of the product is greatly shortened. To avoid this case, a specified installation direction (such as in FIG. 2) of the dry filter will be usually marked outside the barrel 1'. However, because the internal structure thereof cannot be seen from the outside of the barrel 1', an operator may reversely install the dry filter carelessly.

Compared with the prior art, the dry filter in the embodiment 1 has the advantages that the second filter layer 70 is added in a right space of the barrel 10, so that a filter structure in the barrel 10 achieves a symmetry effect. Moreover, preferably, the distance between the first filter plate 41 and the first end cover 20 is equal to the distance between the second filter plate 42 and the second end cover 30, thereby achieving an effect of spatial symmetry of each filter structure in the barrel 10. The structure makes it unnecessary to distinguish front and back surfaces of the dry filter during installation, prevents the operator from reversely installing the dry filter and makes installation more flexible as well.

In addition, the dry filter in the prior art has the problem of inconvenient assembly during assembly of a filter layer, specifically as shown in FIG. 1. A filter layer 4' in the prior art comprises a spring fixing structure and a filter material provided in a spring. The filter material usually adopts a fluffy glass wool material, so as to achieve a certain impurity filtering capability. The combined design of the filter material in the spring needs to satisfy a certain condition. Specifically, during combined assembly of the filter material, a certain compression amount is needed to make impurities uniformly distributed and to maximize the impurity filtering capability. So, during assembly, the height of the filter material, in a fluffy state, inside the spring is usually greater than the total height of the spring by 40 to 70 percent. However, a glass wool plate material is usually made by mold stamping, and once the thickness thereof exceeds 30 mm, it cannot be made on a stamping mold. So, the filter material usually consists of more than four filter sheets, a part higher than the spring is easy to fall off in an assembly process, thereby reducing the quantity of internal filter sheets, and affecting the impurity filtering capability. Meanwhile, in order to position the part, higher than the spring, of the filter sheet on the inner wall of the barrel 1', a part namely a positioning stop screen is added in the prior art. On one hand, the stop screen complicates the assembly action to cause hidden dangers of excessive installation and missing installation of the stop screen. On the other hand, turbulence is generated when the refrigerant flows through the stop screen, and the flowing resistance is increased, thereby reducing the flowing amount.

In order to solve the above-mentioned problem, the applicant improves the fixing structure of the filter layer, specifically as shown in FIG. 4 to FIG. 11. In the technical solution of the embodiment 1, the first fixing structure 50 comprises a first bottom plate 51 and a plurality of first clamping jaws 52. The first bottom plate 51 abuts against the second end cover 30, first overflowing holes 511 are provided on the first bottom plate 51, the first clamping jaws 52 are provided on the first bottom plate 51, a first accommodating space for accommodating the second filter layer 70 is formed between the first clamping jaws 52, and an end, away from the second end cover 30, of each first clamping jaw 52 abuts against the second filter plate 42. Meanwhile, an end, away from the second end cover 30, of each first clamping jaw 52 has a hook portion 521 hooking the second filter layer 70. The structure enables two ends of the second filter layer 70 to be completely fixed by the first filter structure, and eliminates a part, higher than the spring, of a filter assembly in the spring in the prior art. Therefore, a positioning stop screen may be eliminated. Therefore, the first fixing structure 50 in the embodiment 1 simplifies an assembly action of the dry filter, eliminates hidden dangers of excessive installation and missing installation of a stop screen, and alleviates a phenomenon of turbulence of the refrigerant.

Figure 4:
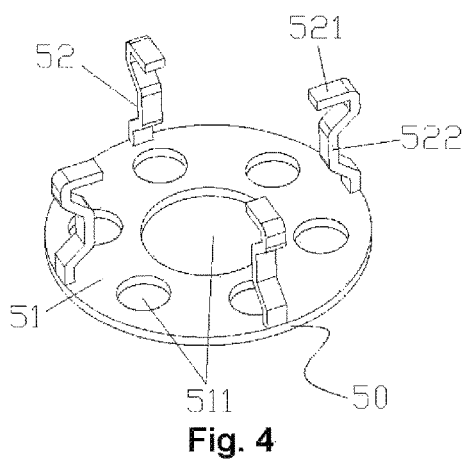
FIG. 4 to FIG. 6 respectively show a structure diagram of a first fixing structure of a dry filter in FIG. 3 from different perspectives.
Figure 5:
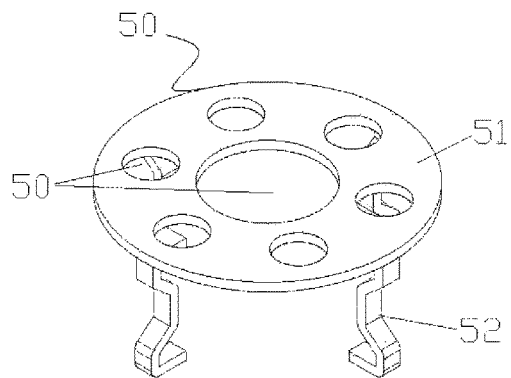
Figure 6:
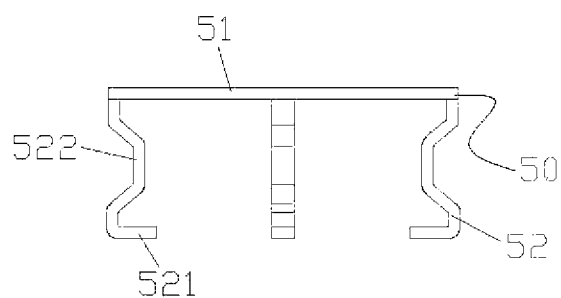
Figure 7:
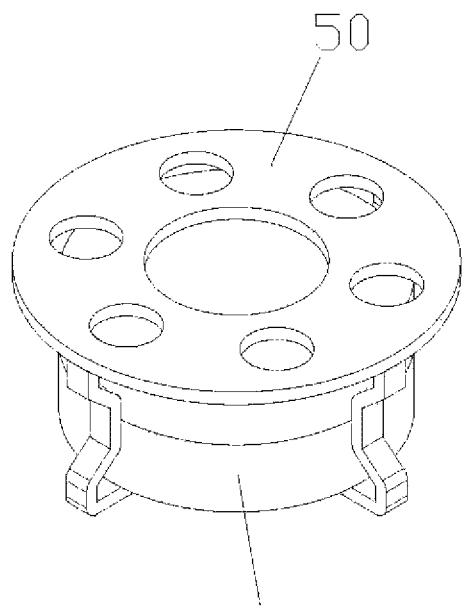
FIG. 7 to FIG. 11 respectively show a structure diagram of a first fixing structure of a dry filter in FIG. 3 assembled with a second filter layer from different perspectives.
Figure 8:
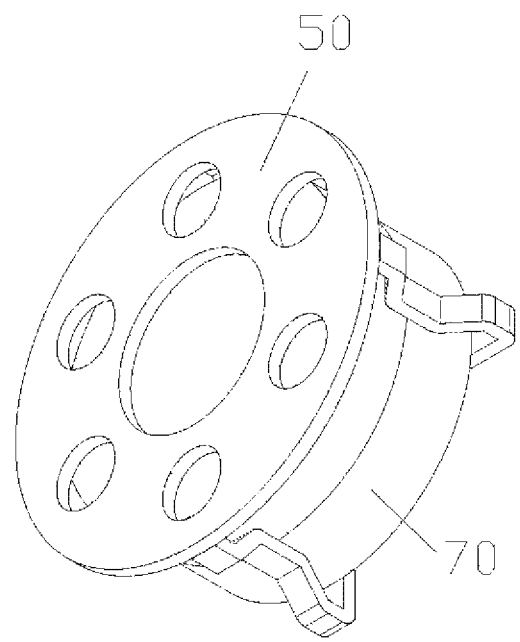
Figure 9:
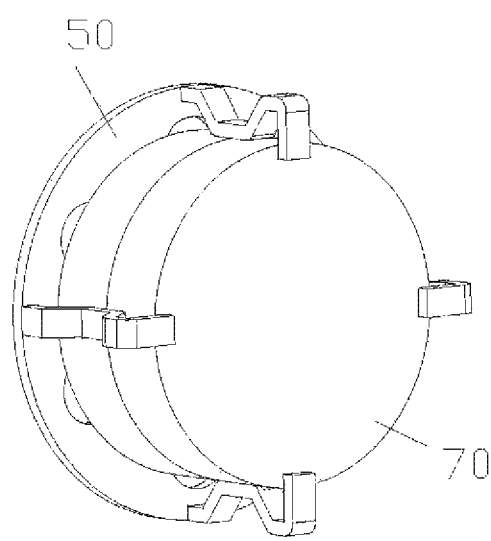
Figure 10:
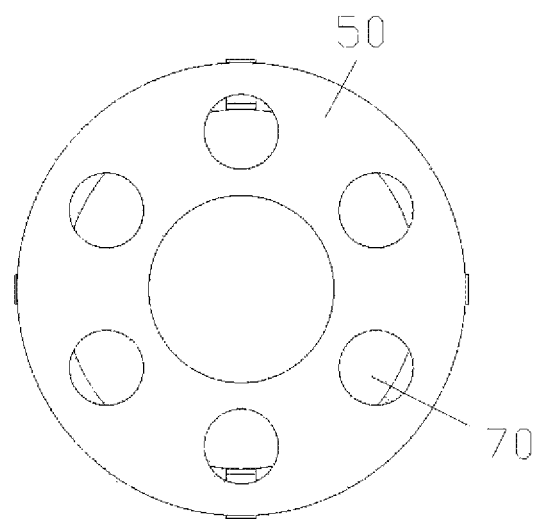
Figure 11:
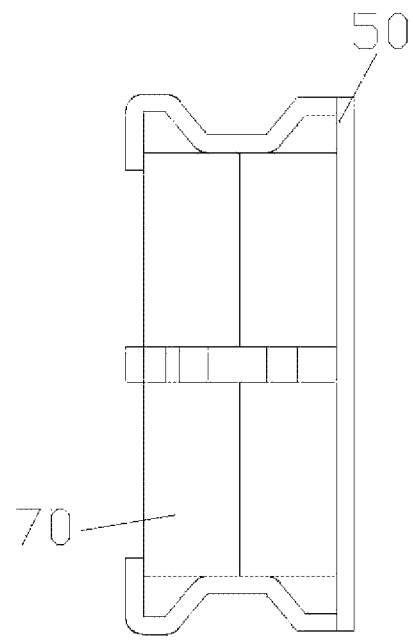

As shown in FIG. 4, in the technical solution of the embodiment 1, each first clamping jaw 52 is provided with a recessed portion 522 fitting an outer side wall of the second filter layer 70, thereby achieving a tight fit between the first fixing structure 50 and the second filter layer 70.

Figure 12:
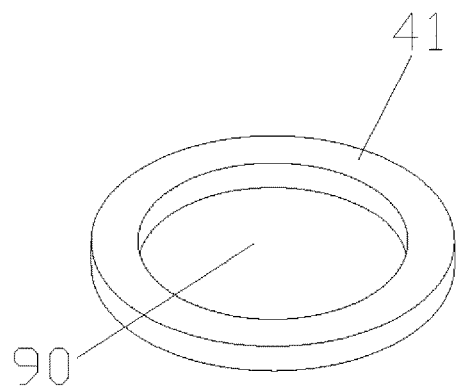
FIG. 12 shows a structure diagram of a first filter plate of a dry filter in FIG. 3.

As shown in FIG. 3, in the technical solution of the embodiment 1, the first filter plate 41 and the second filter plate 42 are of a circular plate structure. If it is necessary to increase the refrigerant flowing amount of the dry filter, under the condition of ensuring a filtering capability, as shown in FIG. 12, a plurality of third overflowing holes 90 may be provided on the first filter plate 41 and/or the second filter plate 42, thereby maximizing the flowing amount.

As shown in FIG. 3, in the technical solution of the embodiment 1, a molecular sieve is provided in the dry chamber. The molecular sieve fills the dry chamber to also achieve a filtering effect in the assembly process.

Figure 13:
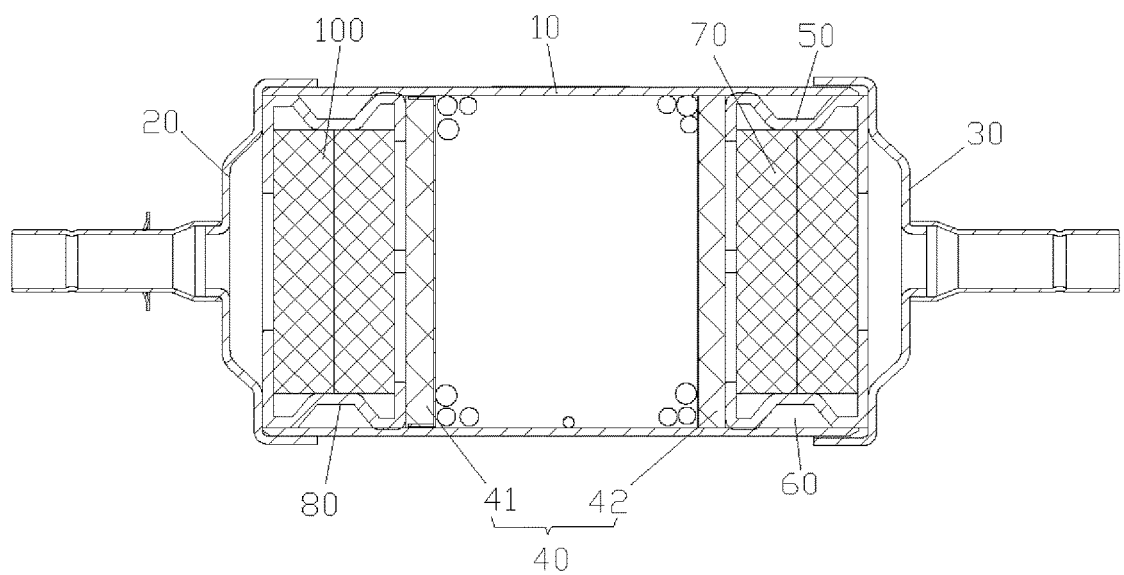
FIG. 13 shows a schematic diagram of an internal structure of a dry filter according to an embodiment 2 of the disclosure.

As shown in FIG. 13, the difference between an embodiment 2 of the dry filter according to the present application and the embodiment 1 lies in that a fixing structure of the first filter layer 100 in the embodiment 2 also adopts the same structure as the first fixing structure in the embodiment 1. Specifically, the first filter layer 100 comprises multiple superposed filter sheets of the first filter layer, and the dry filter further comprises a second fixing structure 80, the multiple filter sheets of the first filter layer being provided in the second fixing structure 80. The second fixing structure 80 comprises a second bottom plate and multiple second clamping jaws, the second bottom plate abuts against the first filter plate 41, and second overflowing holes are provided on the second bottom plate. The multiple second clamping jaws are provided on the second bottom plate, a second accommodating space for accommodating the first filter layer 100 is formed between the multiple second clamping jaws, and an end, away from the first end cover 20, of each second clamping jaw abuts against the first filter plate 41. The second fixing structure 80 and the first fixing structure 50 are consistent in structure and function, and will not be elaborated herein.

In the technical solution of the embodiment 2, the second fixing structure 80 and the first fixing structure 50 are set as identical structures, such that it is completely unnecessary to dispose a stop screen structure in the dry filter, thereby greatly simplifying the assembly process of the dry filter, and alleviating the phenomenon of turbulence of the refrigerant.

The above is only the preferable embodiments of the disclosure, and not intended to limit the disclosure. As will occur to a person skilled in the art, the disclosure is susceptible to various modifications and changes. Any modifications, equivalent replacements, improvements and the like made within the spirit and principle of the disclosure shall fall within the scope of protection of the disclosure.

What is claimed is:

1. A dry filter, comprising:
a barrel (10);
a first end cover (20) and a second end cover (30), sealing two ends of the barrel (10) respectively;
a first filter layer (100), provided at an end, close to the first end cover (20), in the barrel (10); and
a dry layer (40), provided in the barrel (10) and located at a side, away from the first end cover (20), of the first filter layer (100), the dry layer (40) comprising a first filter plate (41) close to the first filter layer (100) and a second filter plate (42) away from the first filter layer (100), the first filter plate (41), the second filter plate (42) and a barrel wall of the barrel (10) forming a dry chamber,
wherein, the dry filter further comprising:
a first fixing structure (50), the first fixing structure (50) defining the position of the second filter plate (42) in the barrel (10), such that a buffer chamber (60) is formed between the second filter plate (42), an inner wall of the barrel (10) and the second end cover (30),
a second filter layer (70), the second filter layer (70) being located in the buffer chamber (60),
the first fixing structure (50) comprises:
a first bottom plate (51), abutting against the second end cover (30), a first overflowing hole (511) being provided on the first bottom plate (51); and
a plurality of first clamping jaws (52), provided on the first bottom plate (51), a first accommodating space for accommodating the second filter layer (70) being formed between the first clamping jaws (52), an end, away from the second end cover (30), of each first clamping jaw (52) abutting against the second filter plate (42).

2. The dry filter as claimed in claim 1, wherein the second filter layer (70) comprises:

a plurality of superposed filter sheets of the second filter layer (70), the filter sheets of the second filter layer (70) being provided in the first fixing structure (50).

3. The dry filter as claimed in claim 1, wherein, an end, away from the second end cover (30), of each first clamping jaw (52) has a hook portion (521) hooking the second filter layer (70).

4. The dry filter as claimed in claim 1, wherein, each first clamping jaw (52) is provided with a recessed portion (522) fitting an outer side wall of the second filter layer (70).

5. The dry filter as claimed in claim 1, wherein, the first filter layer (100) comprises a plurality of superposed filter sheets of the first filter layer (100), the dry filter further comprising:

a second fixing structure (80), the filter sheets of the first filter layer (100) being provided in the second fixing structure (80).

6. The dry filter as claimed in claim 5, wherein, the second fixing structure (80) comprises:

a second bottom plate, abutting against the first filter plate (41), a plurality of second overflowing holes being provided on the second bottom plate; and a plurality of second clamping jaws, provided on the second bottom plate, a second accommodating space for accommodating the first filter layer (100) being formed between the second clamping jaws, an end, away from the first end cover (20), of each second clamping jaw abutting against the first filter plate (41).

7. The dry filter as claimed in claim 1, wherein, the distance between the first filter plate (41) and the first end cover (20) is equal to the distance between the second filter plate (42) and the second end cover (30).

8. The dry filter as claimed in claim 6, wherein, the first filter plate (41) is provided with a third overflowing hole (90); or the second filter plate (42) is provided with a third overflowing hole (90); or the first filter plate (41) and the second filter plate (42) are provided with a third overflowing hole (90).

9. The dry filter as claimed in claim 1, wherein, a molecular sieve is provided in the dry chamber.

* * * * *